US011507059B1

(12) United States Patent
Visan et al.

(10) Patent No.: US 11,507,059 B1
(45) Date of Patent: Nov. 22, 2022

(54) SYSTEM AND COMPUTER-IMPLEMENTED METHOD FOR SEAMLESS CONSUMPTION OF AUTOMATIONS

(71) Applicant: UiPath, Inc., New York, NY (US)

(72) Inventors: Sorin Stefan Visan, Bucharest (RO); Marian Gelu Olteanu, Seattle, WA (US); Iulia Istrate, Bucharest (RO)

( * ) Notice: Subject to any disclaimer, the term of this patent is extended or adjusted under 35 U.S.C. 154(b) by 0 days.

(21) Appl. No.: 17/498,253

(22) Filed: Oct. 11, 2021

(51) Int. Cl.
*B25J 9/16* (2006.01)
*G05B 19/4155* (2006.01)

(52) U.S. Cl.
CPC .................... *G05B 19/4155* (2013.01); *G05B 2219/31229* (2013.01)

(58) Field of Classification Search
CPC ...... G05B 19/4155; G05B 2219/31229; G06N 20/00; G06F 8/60; G06F 21/6218; G06F 30/27; G06F 8/71; H04L 41/16; B25J 9/163; B25J 9/1661; G06Q 10/10
See application file for complete search history.

(56) References Cited

U.S. PATENT DOCUMENTS

| | | | | |
|---|---|---|---|---|
| 9,652,741 | B2 | 5/2017 | Goldberg et al. | |
| 11,110,601 | B2 * | 9/2021 | Bannoura | G06Q 10/10 |
| 11,117,259 | B2 * | 9/2021 | Hall | B25J 9/1661 |
| 2017/0103137 | A1 | 4/2017 | Lawson et al. | |
| 2021/0107141 | A1 * | 4/2021 | Shrivastava | G06N 20/00 |
| 2021/0110035 | A1 * | 4/2021 | Seth | G06N 20/00 |
| 2021/0120315 | A1 * | 4/2021 | Makinen | H04N 21/236 |
| 2022/0011732 | A1 * | 1/2022 | Hall | G06F 21/6218 |
| 2022/0164700 | A1 * | 5/2022 | Shrivastava | G06F 21/6218 |
| 2022/0164701 | A1 * | 5/2022 | Shrivastava | G06F 21/6218 |

FOREIGN PATENT DOCUMENTS

| | | |
|---|---|---|
| KR | 1020150073110 A | 6/2015 |
| KR | 1020210099218 A | 8/2021 |

OTHER PUBLICATIONS

Islam, Android Application Based Smart Home Automation System Using Internet of Things, 2018, IEEE, p. 1-9 (Year: 2018).*

(Continued)

*Primary Examiner* — McDieunel Marc
(74) *Attorney, Agent, or Firm* — LeonardPatel PC

(57) ABSTRACT

A system and a method for accessing at least one automation from an automation store are provided. The method comprises receiving a user input indicative of selection of at least one automation for accessing from a plurality of automations displayed in the automation store, and automatically uploading, in response to receiving the user input, the selected automation to a personal workspace of the user from the automation store. The automations are accessed via one or more Application Programming Interface (API) calls directed to an automation cloud server. Further, the method comprises generating a notification indicative of upload of the selected automation for accessing the automation. The uploaded automation is displayed in a software robot assistant associated with the user. Furthermore, the method comprises displaying the generated notification in an application interface associated with the automation store and displaying the selected automation in the personal workspace in the application interface.

20 Claims, 14 Drawing Sheets

(56) References Cited

OTHER PUBLICATIONS

Savulescu et al., Collaborative data management for business: A review of collaborative techniques, 2016, IEEE, p. 1-4 (Year: 2016).*

Castiglione et al., Automated Production of Predetermined Digital Evidence, 2016, IEEE, p. 216-231 (Year: 2016).*

Shaila et al., Support automation connectivity system for big data applications, 2017, IEEE, p. 805-809 (Year: 2017).*

International Search Report & Written Opinion, dated Jul. 6, 2022, PCT Application No. PCT/US21/57170.

* cited by examiner

Automation store

Automation store > Onboarding of new employee

Onboarding of new employee ★★★★★ ≈0

By Jane Doe

[Human resources] > [Recruit & onboard employees] > [Manage pre-employment verification]

Description
Automate onboarding admin tasks:
- Archive signed offer letter from lever to sharepoint in personel file
- Collect personal information from new hire
- Draft employment agreement based on location
- Create workday profile
- Notify necessary parties to setup the user account
- Send welcome email
- Schedule onboarding call
- Benefits environment
Applications used
[SAP solution manager 7.2] [Lever]
[Workday] [Excel]

Pain Points
Manual Process significant volumes to process

Negative Impact
The cycle time is long and actually prone to human errors

Post automation results
• Each run now takes 123 minutes which is up (↑2%) from 120 minutes before automation Sidebar: Home, Automation hub, Actions, Apps, Processes, Admin, Automation store, Help

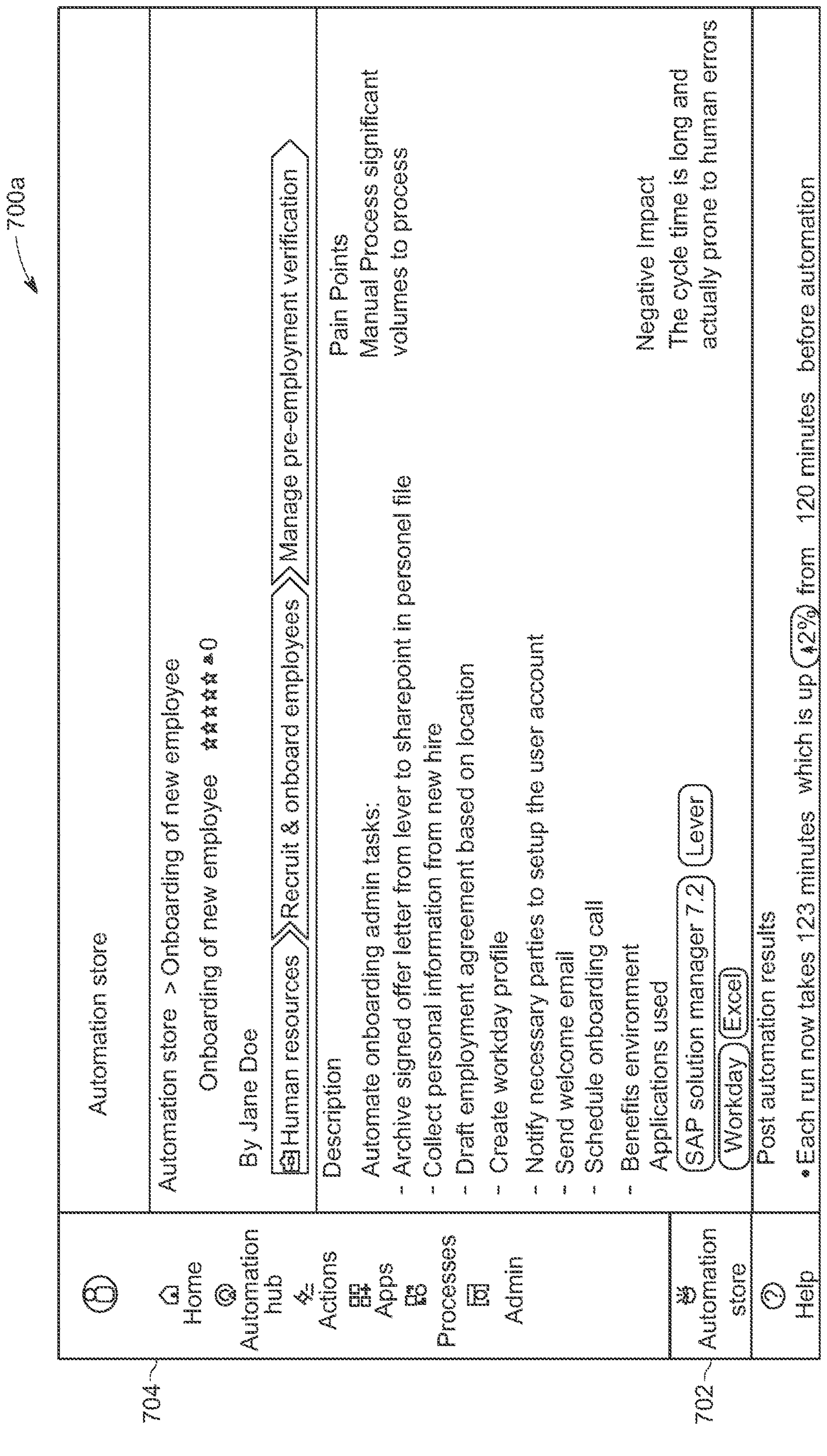

FIG. 7A

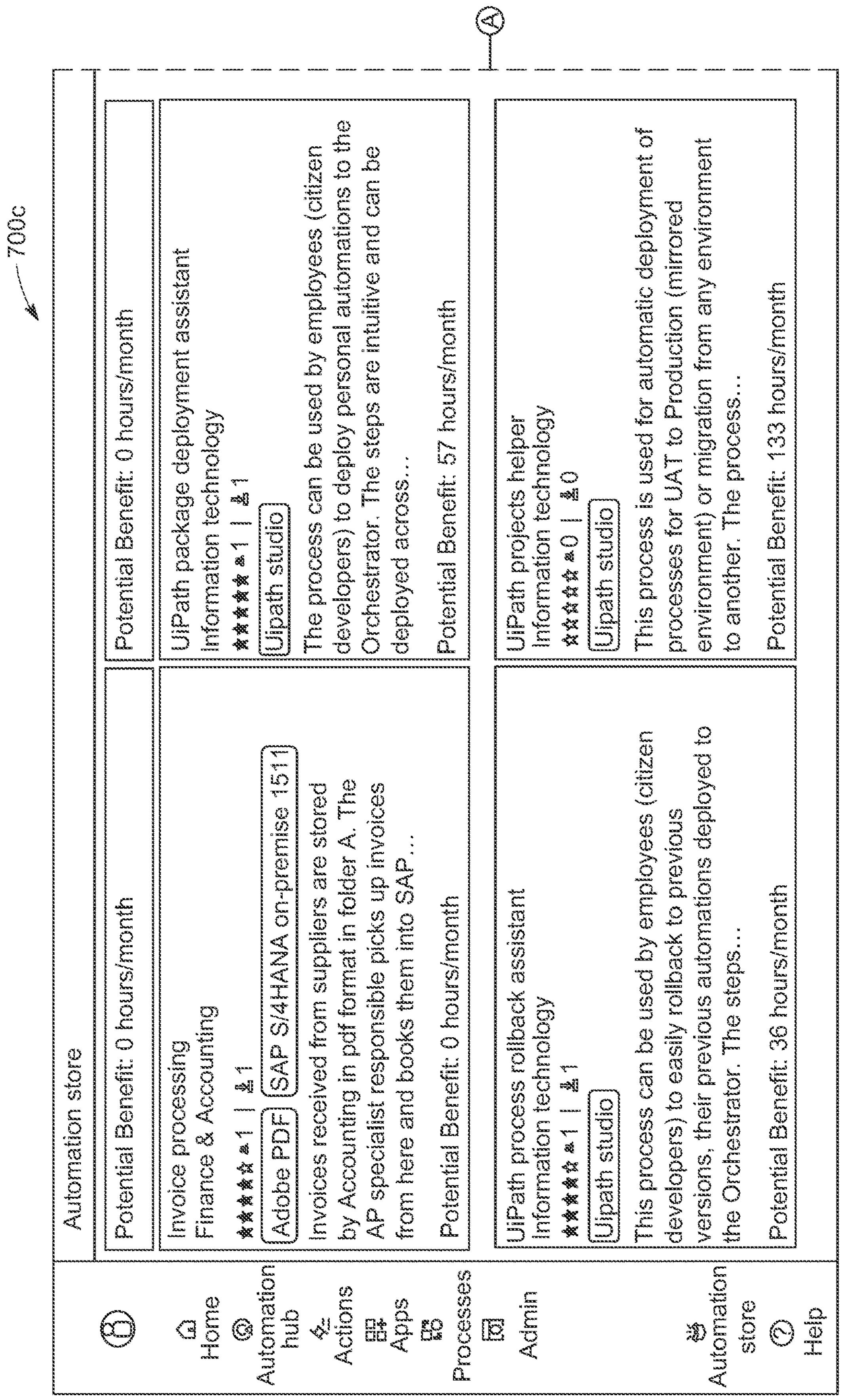

FIG. 7C

Automation store

Potential Benefit: 0 hours/month

Invoice processing
Finance & Accounting
★★★★☆ ★1 | ♜1
[Adobe PDF] [SAP S/4HANA on-premise 1511]
Invoices received from suppliers are stored by Accounting in pdf format in folder A. The AP specialist responsible picks up invoices from here and books them into SAP...

Potential Benefit: 0 hours/month

Potential Benefit: 0 hours/month

UiPath package deployment assistant
Information technology
★★★★★ ★1 | ♜1
[Uipath studio]
The process can be used by employees (citizen developers) to deploy personal automations to the Orchestrator. The steps are intuitive and can be deployed across...

Potential Benefit: 57 hours/month

UiPath process rollback assistant
Information technology
★★★★★ ★1 | ♜1
[Uipath studio]
This process can be used by employees (citizen developers) to easily rollback to previous versions, their previous automations deployed to the Orchestrator. The steps...

Potential Benefit: 36 hours/month

UiPath projects helper
Information technology
★★★★★ ★0 | ♜0
[Uipath studio]
This process is used for automatic deployment of processes for UAT to Production (mirrored environment) or migration from any environment to another. The process...

Potential Benefit: 133 hours/month

- Home
- Automation hub
- Actions
- Apps
- Processes
- Admin
- Automation store
- Help

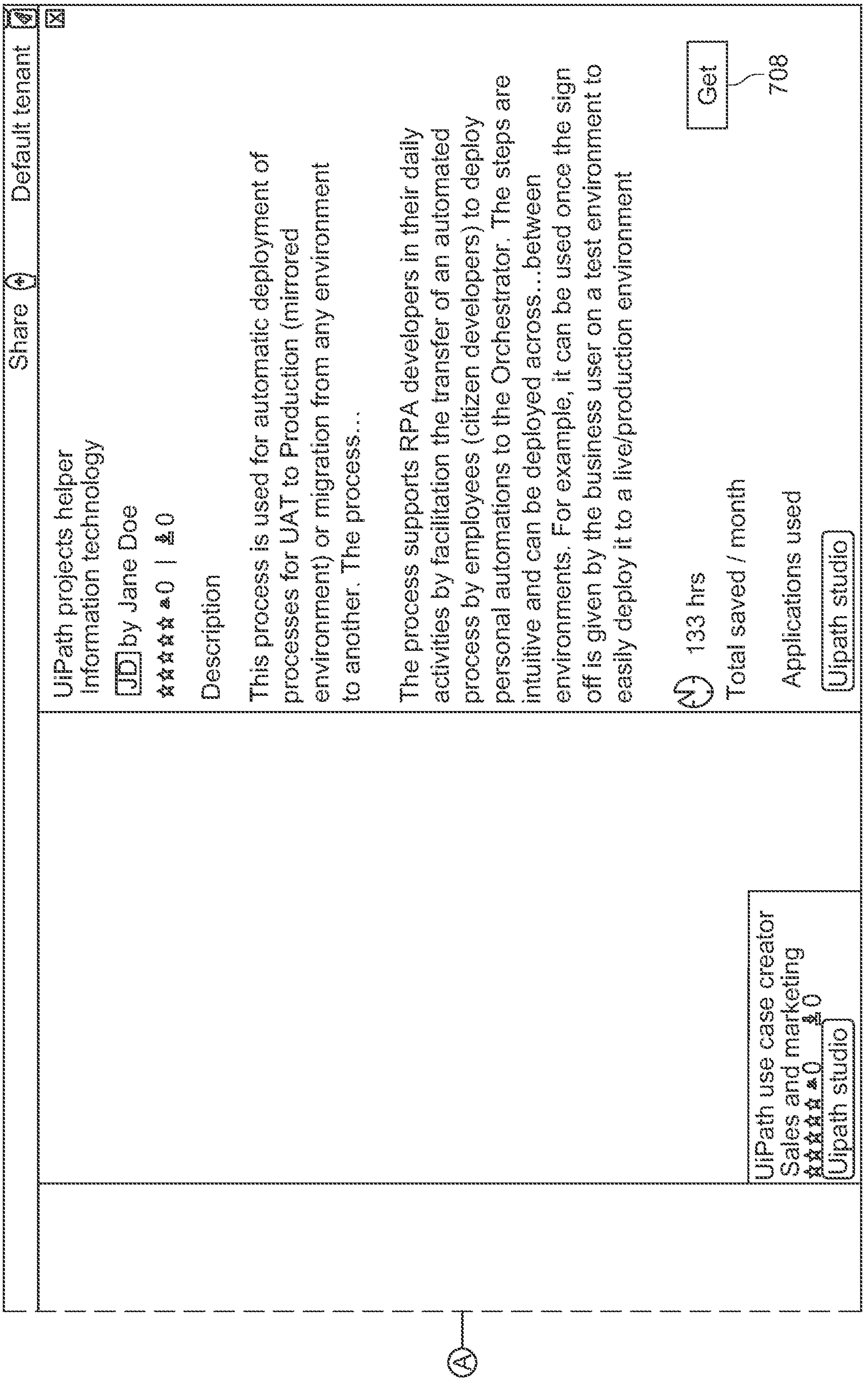

FIG. 7C (Cont.)

UiPath projects helper
Information technology
[JD] by Jane Doe
☆☆☆☆☆ ✎0 | 👤0

Description

This process is used for automatic deployment of processes for UAT to Production (mirrored environment) or migration from any environment to another. The process...

The process supports RPA developers in their daily activities by facilitation the transfer of an automated process by employees (citizen developers) to deploy personal automations to the Orchestrator. The steps are intuitive and can be deployed across...between environments. For example, it can be used once the sign off is given by the business user on a test environment to easily deploy it to a live/production environment 133 hrs
Total saved / month Applications used
Uipath studio Get — 708

Share ⊕ Default tenant

UiPath use case creator
Sales and marketing
☆☆☆☆☆ ✎0 👤0
Uipath studio

Ⓐ

SYSTEM AND COMPUTER-IMPLEMENTED METHOD FOR SEAMLESS CONSUMPTION OF AUTOMATIONS

FIELD

The present invention generally relates to robotic process automation (RPA), and more specifically, to seamless consumption of automations from an automation store.

BACKGROUND

Generally, RPA facilitates the proliferation of software automation due to its execution of relatively simple, repeatable tasks that exist in large numbers within an enterprise. RPA applications automate repetitive activities and manual tasks of a computing system. The manual tasks are increasingly performed by software robots using RPA tools. Currently, RPA tools are available which may help a user to discover, prioritize and track automations for the repetitive activities and the manual tasks in a repository such as an automation store. For example, employees of the enterprise shares ideas for automations and stores the automations in the automation store that may be helpful to other employees in the enterprise.

Typically, the user sends a request for consuming a desired automation from the automation store. However, the user must manually perform all the tasks required to provision the automation. For instance, the user manually uploads the automation in a folder, such as a personal workspace of the user, which is time consuming and mundane.

Accordingly, there is a need to address this problem and provide an enhanced solution for consumption of automations from the automation store.

SUMMARY

Certain embodiments of the present invention provide better and easy solutions to the problems and needs in the art that have not yet been fully identified, appreciated, or solved by current RPA technologies. For example, some embodiments of the present invention pertain to seamless consumption of automations from an automation store.

In an embodiment, a system for accessing at least one automation from an automation store includes memory and at least one processor. The memory stores one or more computer-executable instructions, and the at least one processor is configured to execute the one or more computer-executable instructions to receive a user input indicative of selection of at least one automation for accessing from a plurality of automations displayed in the automation store. The selected automation is accessed via one or more Application Programming Interface (API) calls directed to an automation cloud server. The at least one processor is further configured to execute the one or more instructions to upload, in response to receiving the user input, the selected automation to a personal workspace associated with the user in the automation store. The at least one processor is further configured to execute the one or more instructions to generate a notification indicative of upload of the selected automation for accessing the automation. The uploaded automation is displayed in a software robot assistant associated with the user. The at least one processor is further configured to execute the one or more instructions to display, in an application interface associated with the automation store, the generated notification.

In an embodiment, a computer-implemented method includes employing at least one hardware processor for executing a series of operations. The series of operations are used for accessing at least one automation from an automation store. The series of operations include receiving a user input indicative of selection of at least one automation for accessing from a plurality of automations in the automation store. The selected automation is accessed via one or more Application Programming Interface (API) calls directed to an automation cloud server. The series of operations further includes automatically uploading, in response to receiving the user input, the selected automation to a personal workspace associated with the user in the automation store. The automatic upload prevents a manual intervention to provision the selected automation in the personal workspace. The manual intervention corresponds to a manual upload of the selected automation. The series of operations further include generating a notification indicative of the upload of the selected automation for accessing the automation. The uploaded automation is displayed in a software robot assistant associated with the user. The series of operations further include displaying the generated notification in an application interface associated with the automation store and displaying the selected automation in the personal workspace in the application interface.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 7A-7E show graphical user interfaces (GUIs) for consuming automation from an automation store, according to an embodiment of the present invention.

DETAILED DESCRIPTION OF THE EMBODIMENTS

Figure 1:
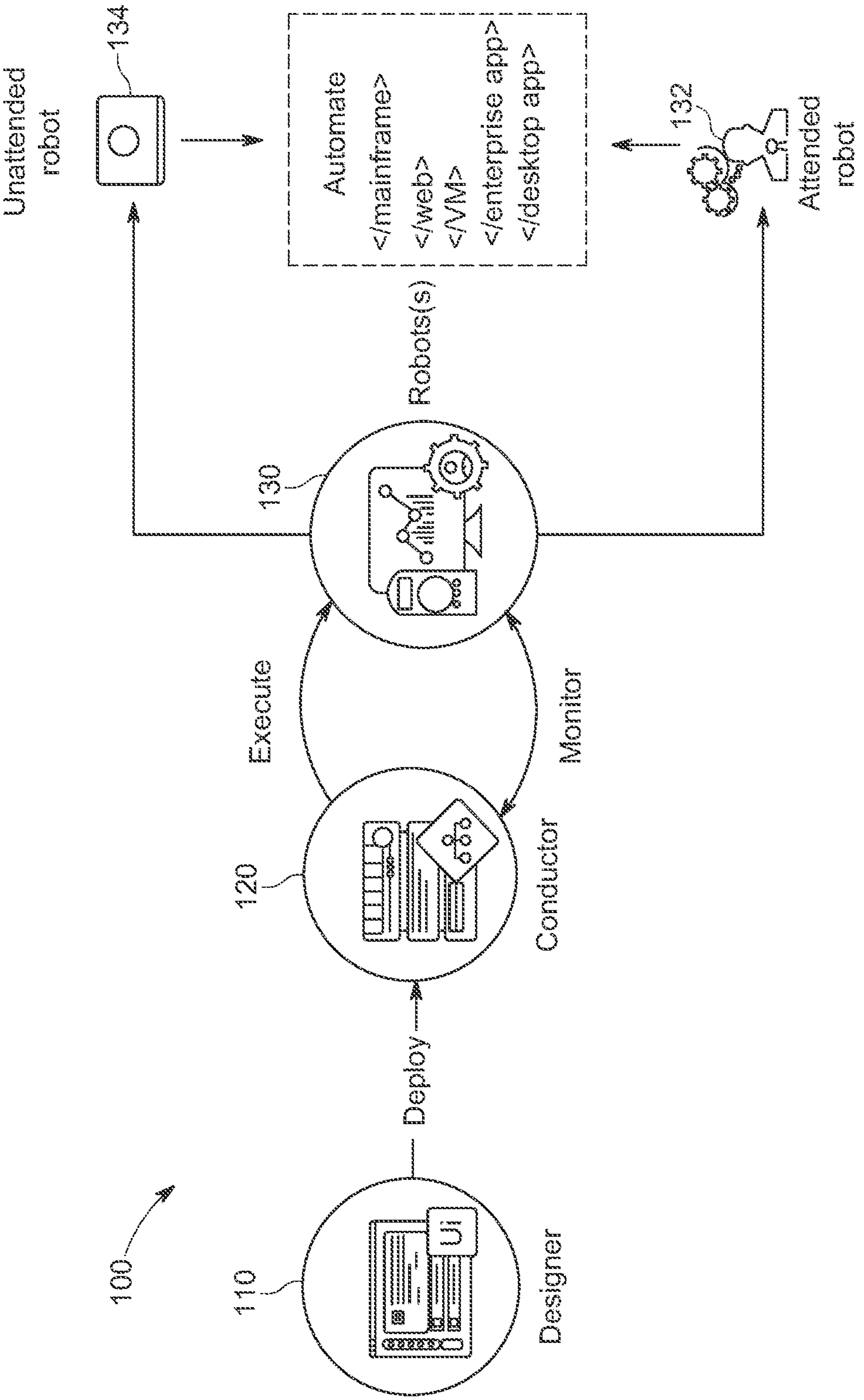
FIG. 1 is an architectural diagram illustrating an RPA system, according to an embodiment of the present invention.

Some embodiments pertain to a system (hereinafter the “computing system”) configured to provide seamless consumption of automation from an automation store. In some embodiments, automation corresponds to an automation package for automating manual operations of an activity or a workflow. The automation package is created based on an automation idea, which is shared by a user in an automation cloud server. The automation cloud server (also referred to as "automation cloud") serves as a cloud-based Software-as-a-Service (SaaS) platform for managing automation packages corresponding to one or more automation ideas shared by the user or other users. The user in some embodiments is a technical user, a non-technical user, and/or the like. The shared automation idea is implemented in the form of an automation, and then updated into a production status based on review by a reviewer. The automation store may be enabled as a service in the automation cloud prior to the review of the automation package. To that end, the service corresponding to the automation store is provisioned via a setting at a tenant level in the automation cloud. For instance, an administrative user (referred to as "admin"), who has privileges and access rights for configuration of tenants and permissions for automation store and for the automation cloud, selects a tenant to enable the automation store. The tenant in some embodiments is an instance for the service corresponding to the automation store (referred to as automation store service) in the automation cloud. Such automation store service may improve visibility and discoverability of the automation for the user. The visibility and discoverability of the automation may be contributed by one or more factors, such as number of downloads or usage of the automation by other users, types of feedbacks/reviews shared by the other users for the automation, potential benefits of the automation based on the usage by the other users, or the like. These one or more factors may also impact on value of the automation that may influence the user to consume the automation from the automation store.

After enabling the service corresponding to the automation store, another service corresponding to instant consumption of the automation from the automation store is enabled. The enablement of the service corresponding to instant consumption of the automation is provisioned from an automation hub. The automation hub is a cloud service for managing an automation pipeline allowing users to discover, prioritize, and track automation ideas in one place. When the service corresponding to instant consumption of automation is enabled, consumption of automation from the automation store is automated.

The instant consumption service allows uploading a selected automation to a personal workspace (i.e. an automation folder) associated with the user, from the automation store. The personal workspace is the automation folder created in Orchestrator® that is used as a cloud service by the user on the same tenant in the automation cloud. In an example embodiment, the system is configured to display a user-interface element, such as a GET button to the user upon selection of the automation from the automation store. When the user clicks on the button, the selected automation is automatically uploaded from the automation store to the personal workspace (i.e. an automation folder) via Application Programming Interface (API) calls directed to the automation cloud. To that end, the selected automation is accessed via one or more API calls directed to an automation cloud server. More specifically, the API calls enable communication between the automation store and the Orchestrator® that created the personal workspace. In some cases, the user may belong to a group of cloud users. In such cases, Orchestrator® for the group of users is integrated to the automation store. The automatic upload of the automation upon selection of the user-interface element, i.e., the GET button precludes manual intervention to perform tasks to provision the automation in the personal workspace.

The user browses the automation store in an application interface. In one embodiment, the application interface corresponding to the automation store may be accessed as a web-based application. The user selects an automation from the automation store. The selected automation is uploaded to a personal workspace associated with the user, and the uploaded automation is displayed in a software robot assistant associated with the user. In the software robot assistant of the user, a process, such as a computer-implemented process, corresponding to the uploaded automation is created for the user. To that end, the software robot assistant includes a process list that includes all the processes associated with the software robot assistant. For example, the selected automation is uploaded to the user's personal workspace, a new process is generated corresponding to the uploaded automation. This new process is then associated with the process list of the software robot assistant for that user. Further, the process also becomes visible for viewing and/or accessing a user selected automation from the automation store.

Additionally, for the enablement of the instant consumption service, the system checks accessibility to the Orchestrator® by the user as well as availability of the personal workspace for the user. The automatically uploaded automation in the personal workspace upon the user selection of the user-interface element, i.e., the GET button, precludes manual intervention to perform tasks to provision the automation in the personal workspace. The user selection of the user-interface element also precludes the need to manually create the process in the software robot assistant, which improves usability of the automation.

When the automation store service and the instant consumption service are enabled, the reviewer having publishing permission publishes the automation n the automation hub. The published automation is visible to the user based on a set of criteria and a set of permissions set for the user by the admin. The set of criteria may include governance policies and rules to be adhered by the user for accessing the automation. The permissions may include a view permission, an edit permission, a create permission, a delete permission, and/or the like. In some example embodiments, the permissions may be associated with a certain role of the user. The role may be limited to one or more categories which allow the user to publish automations only to specific areas. For instance, a user associated with a standard user role for finance and accounting category may view automations from that specific category.

In some embodiments, a system may notify about the uploaded automation to the user via the software robot assistant. The software robot assistant is connected to the Orchestrator®, which provides or is integrates with a corresponding personal workspace of the user. Additionally or alternatively, the software robot assistant refreshes data from the Orchestrator® by periodically checking and fetching a new automation uploaded to the Orchestrator®.

Some embodiments incorporate use of computationally efficient technologies like robotic process automation (RPA) to provide high degree of computational efficiency, by providing improved execution time and reduced storage requirements and at the same time, less complexity at user device level. This is because the "system" may be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the embodiments in any way but is intended to provide one example of the many embodiments. Indeed, some embodiments may be implemented in localized and distributed forms consistent with computing technology, including cloud computing systems. These and other architectural configurations are discussed in the following description, without limiting the scope of the embodiments of the present invention.

FIG. 1 is an architectural diagram illustrating an RPA system 100, according to an embodiment of the present invention. RPA system 100 includes a designer 110 that allows a developer (e.g., a technical user) or a user (e.g., a non-technical user) to design and implement a plurality of automations for automating manual operations of activities or workflows. Designer 110 provides a solution for application integration, as well as automating third-party applications, administrative Information Technology (IT) tasks, and business IT processes. Designer 110 further facilitates development of an automation package, which is a graphical representation of a business process. Simply put, designer 110 facilitates the development and deployment of the plurality of automations.

The automation project enables automation of rule-based processes by giving the developer control of the execution order and the relationship between a custom set of steps developed in a workflow, defined herein as "activities." One commercial example of an embodiment of designer 110 is UiPath Studio™. In some embodiments, designer 110 shares the plurality of automations in an automation hub, such as UiPath™ Automation Hub. Each activity includes an action, such as clicking a button, reading a file, writing to a log panel, typing into a text box, hovering over a GUI element, etc. In some embodiments, workflows can be nested or embedded.

Some types of workflows include, but are not limited to, sequences, flowcharts, Finite State Machines (FSMs), and/or global exception handlers. Sequences are particularly suitable for linear processes, enabling flow from one activity to another without cluttering a workflow. Flowcharts are particularly suitable to more complex business logic, enabling integration of decisions and connection of activities in a more diverse manner through multiple branching logic operators. FSMs are particularly suitable for large workflows. FSMs use a finite number of states in their execution, which can be triggered by a condition (i.e., transition) or an activity. Global exception handlers are particularly suitable for determining workflow behavior when encountering an execution error and for debugging processes.

Once a workflow is developed in designer 110, execution of business processes is orchestrated by a conductor 120 (or Orchestrator®), which orchestrates one or more robots 130 that execute the workflows developed in designer 110. One commercial example of an embodiment of conductor 120 is UiPath Orchestrator® Conductor 120 facilitates management of the creation, monitoring, and deployment of resources in an environment. Conductor 120 acts as an integration point with third-party solutions and applications. In an embodiment, conductor 120 is integrated with a web-based user interface.

Conductor 120 manages a fleet of robots 130, connecting and executing robots 130 from a centralized point. Types of robots 130 that are managed include, but are not limited to, attended robots 132, unattended robots 134, development robots (similar to the unattended robots 134, but used for development and testing purposes), and nonproduction robots (similar to the attended robots 132, but used for development and testing purposes). The attended robots 132 are triggered by user events and operate alongside a human on the same computing system. The attended robots 132 are used with conductor 120 for a centralized process deployment and logging medium. Attended robots 132 help a human user accomplish various tasks and are triggered by the user events. In some embodiments, processes are not started from conductor 120 on this type of robot and/or they do not run under a locked screen. In certain embodiments, the attended robots 132 are started from a robot tray or from a command prompt. The attended robots 132 run under human supervision in some embodiments.

The unattended robots 134 run unattended in virtual environments and automate many processes. The unattended robots 134 are responsible for remote execution, monitoring, scheduling, and providing support for work queues. Debugging for all robot types is run in designer 110 in some embodiments. Both the attended robots 132 and unattended robots 134 automate various systems and applications including, but not limited to, mainframes, web applications, Virtual machines (VMs), enterprise applications (e.g., those produced by SAP®, SalesForce®, Oracle®, etc.), and computing system applications (e.g., desktop and laptop applications, mobile device applications, wearable computer applications, etc.).

Conductor 120 has various capabilities including, but not limited to, provisioning, deployment, configuration, queueing, monitoring, logging, and/or providing interconnectivity. Provisioning includes creating and maintenance of connections between robots 130 and conductor 120 (e.g., a web application). Deployment includes assuring the correct delivery of package versions to the assigned robots 130 for execution. Configuration includes maintenance and delivery of robot environments and process configurations. Queueing includes providing management of queues and queue items. Monitoring includes keeping track of robot identification data and maintaining user permissions. Logging includes storing and indexing logs to a database (e.g., an SQL database) and/or another storage mechanism (e.g., ElasticSearch®, which provides an ability to store and quickly query large datasets). Conductor 120 provides interconnectivity by acting as the centralized point of communication for the third-party solutions and/or applications.

Robots 130 can be execution agents that run workflows built in designer 110. One commercial example of some embodiments of the robot(s) 130 is UiPath Robots™ In some embodiments, robots 130 install the Microsoft Windows® Service Control Manager (SCM)-managed service by default. As a result, robots 130 can open interactive Windows® sessions under the local system account and have rights of a Windows® service.

In some embodiments, robots 130 are installed in a user mode. For such robots 130, this means they have the same rights as the user under which a given robot 130 has been installed. This feature is also available for High Density (HD) robots, which ensure full utilization of each machine at its maximum potential. In some embodiments, any type of robots 130 can be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between the conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. The user mode robot services can be trusted with and manage the credentials for robots 130. A Windows® application is automatically launched if the SCM-managed robot service is not installed.

Executors run given jobs under a Windows® session (i.e., they may execute workflows). The executors are aware of per-monitor dots per inch (DPI) settings. Agents could be Windows® Presentation Foundation (WPF) applications that display the available jobs in the system tray window. The agents could be a client of the service. The agents request to start or stop jobs and change settings. The command line is a client of the service. The command line is a console application that requests to start jobs and waits for their output.

Having components of robots 130 split as explained above helps developers, support users, and computing systems more easily run, identify, and track what each component is executing. Special behaviors can be configured per component this way, such as setting up different firewall rules for the executor and the service. The executor is always aware of the DPI settings per monitor in some embodiments. As a result, the workflows can be executed at any DPI, regardless of the configuration of the computing system on which they were created. Projects from designer 110 can also be independent of a browser zoom level in some embodiments. For applications that are DPI-unaware or intentionally marked as unaware, DPI is disabled in some embodiments.

Figure 2:
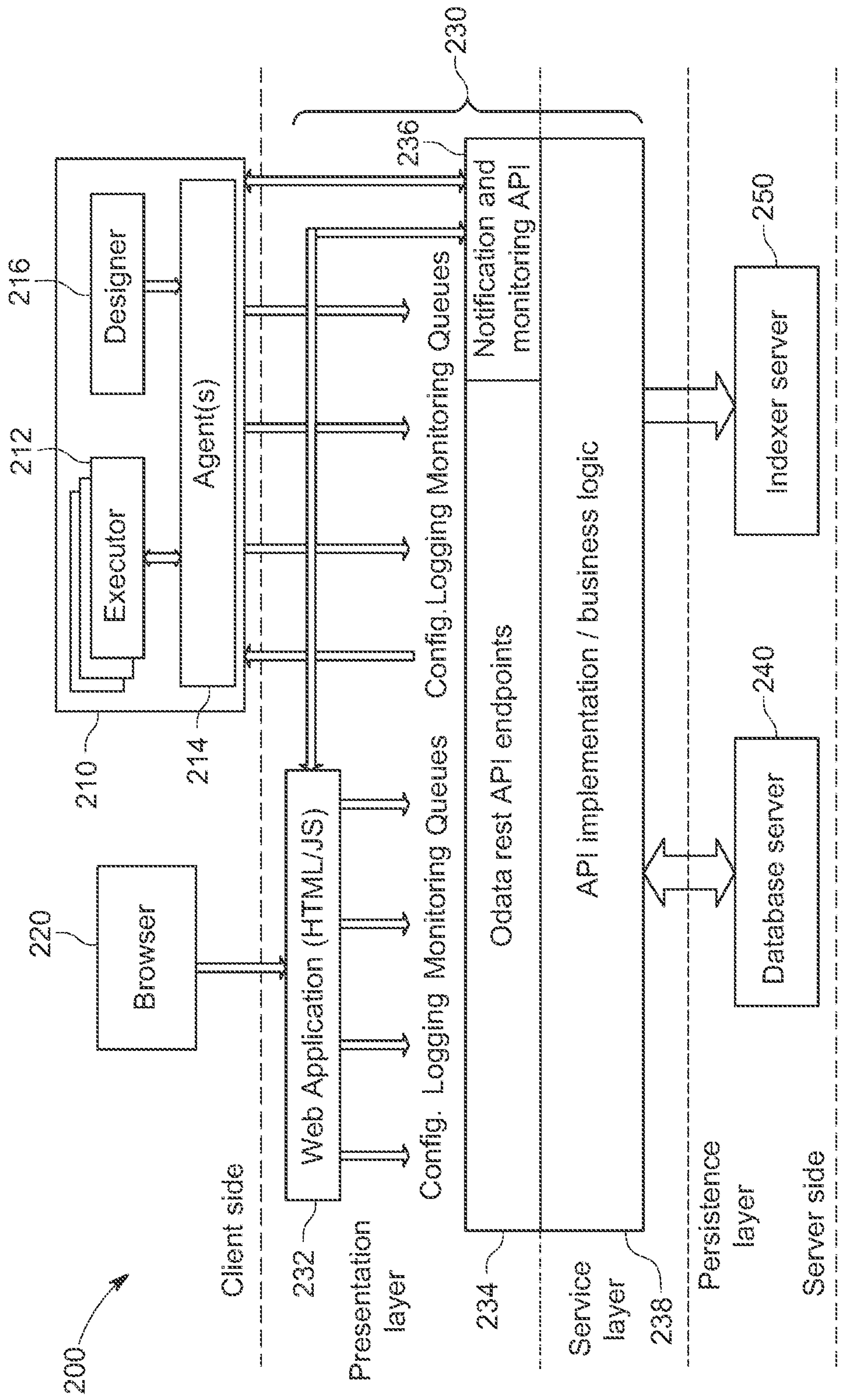
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may not be a part of, RPA system 100 of FIG. 1. It should be noted that a client side, a server side, or both, may include any desired number of the computing systems without deviating from the scope of the invention. On the client side, a robot application 210 includes executors 212, an agent 214, and a designer 216 (for instance, the designer 110). However, in some embodiments, designer 216 is not running on robot application 210. Executors 212 are running processes. Several business projects (i.e. executors 212) run simultaneously, as shown in FIG. 2. Agent 214 (e.g., the Windows® service) is the single point of contact for all executors 212 in this embodiment. All messages in this embodiment are logged into a conductor 230, which processes them further via a database server 240, an indexer server 250, or both. As discussed above with respect to FIG. 1, executors 212 are robot components.

In some embodiments, a robot represents an association between a machine name and a username. The robot manages multiple executors at the same time. On computing systems that support multiple interactive sessions running simultaneously (e.g., Windows® Server 2012), there multiple robots are running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 opens a WebSocket channel that is later used by conductor 230 to send commands to the robot (e.g., start, stop, etc.).

On the server side, a presentation layer (a web application 232, an Open Data Protocol (OData) Representative State Transfer (REST) Application Programming Interface (API) endpoints 234, and a notification and monitoring API 236), a service layer (an API implementation/business logic 238), and a persistence layer (the database server 240 and the indexer server 250) are included. Conductor 230 may include web application 232, the OData REST API endpoints 234, the notification and monitoring API 236, and the API implementation/business logic 238. In some embodiments, most actions that a user performs in an interface of conductor 230 (e.g., via a browser 220) are performed by calling various APIs. Such actions include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user creates robot groups, assign packages to the robots, analyze logs per robot and/or per process, start and stop robots, etc.

In addition to web application 232, conductor 230 also includes service layer that exposes the OData REST API endpoints 234. However, other endpoints may be included without deviating from the scope of the invention. The REST API is consumed by both web application 232 and agent 214. The agent 214 is the supervisor of the one or more robots on the client computer in this embodiment.

The REST API in this embodiment covers configuration, logging, monitoring, and queueing functionality. The configuration endpoints are used to define and configure application users, permissions, robots, assets, releases, and environments in some embodiments. Logging REST endpoints are used to log different information, such as errors, explicit messages sent by the robots, and other environment-specific information, for instance. Deployment REST endpoints are used by the robots to query the package version that should be executed if the start job command is used in conductor 230. Queueing REST endpoints are responsible for queues and queue item management, such as adding data to a queue, obtaining a transaction from the queue, setting the status of a transaction, etc.

Monitoring REST endpoints monitor web application 232 and agent 214. The notification and monitoring API 236 could be REST endpoints that are used for registering agent 214, delivering configuration settings to agent 214, and for sending/receiving notifications from the server and agent 214. The notification and monitoring API 236 also use WebSocket communication in some embodiments.

The persistence layer includes a pair of servers in this embodiment-database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 manages queues and queue items. In some embodiments, database server 240 stores messages logged by the robots (in addition to or in lieu of indexer server 250).

Indexer server 250, which is optional in some embodiments, stores and indexes the information logged by the robots. In certain embodiments, indexer server 250 could be disabled through the configuration settings. In some embodiments, indexer server 250 uses ElasticSearch®, which is an open-source project full-text search engine. The messages logged by robots (e.g., using activities like log message or write line) are sent through the logging REST endpoint(s) to indexer server 250, where they are indexed for future utilization.

Figure 3:
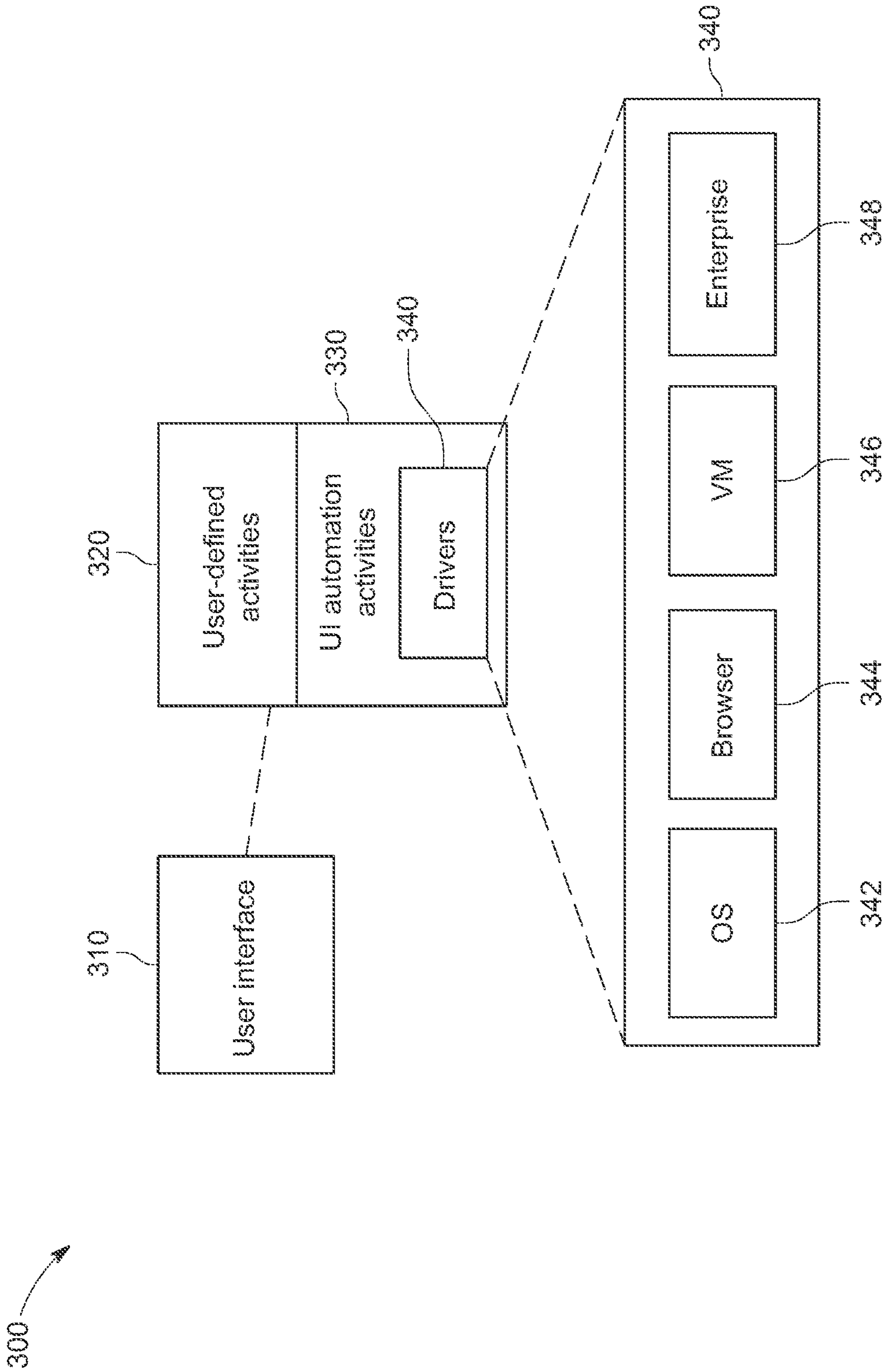
FIG. 3 is an architectural diagram illustrating the relationship between a designer, activities, and drivers, according to an embodiment of the present invention.
Figure 7B:
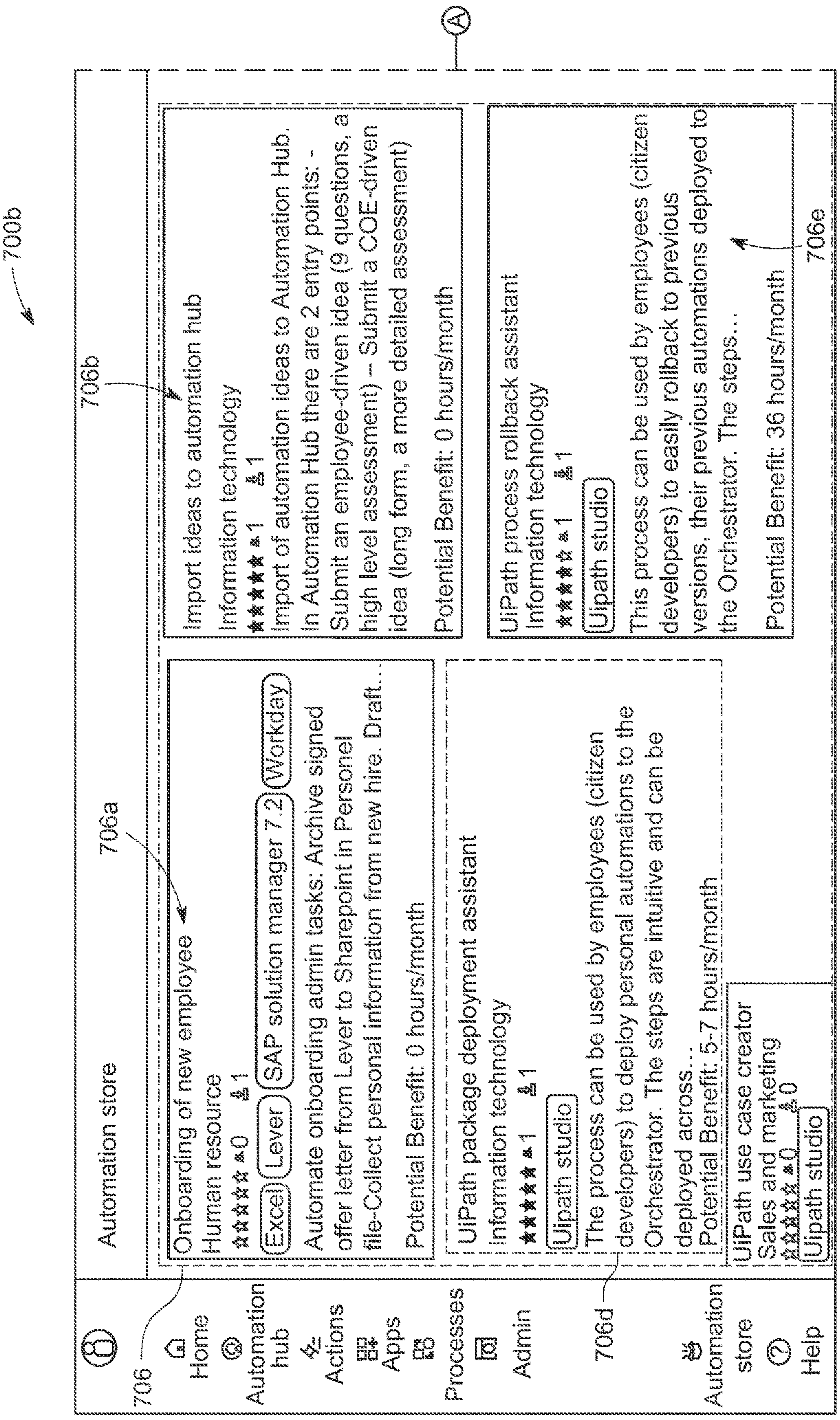
Figure 7B:
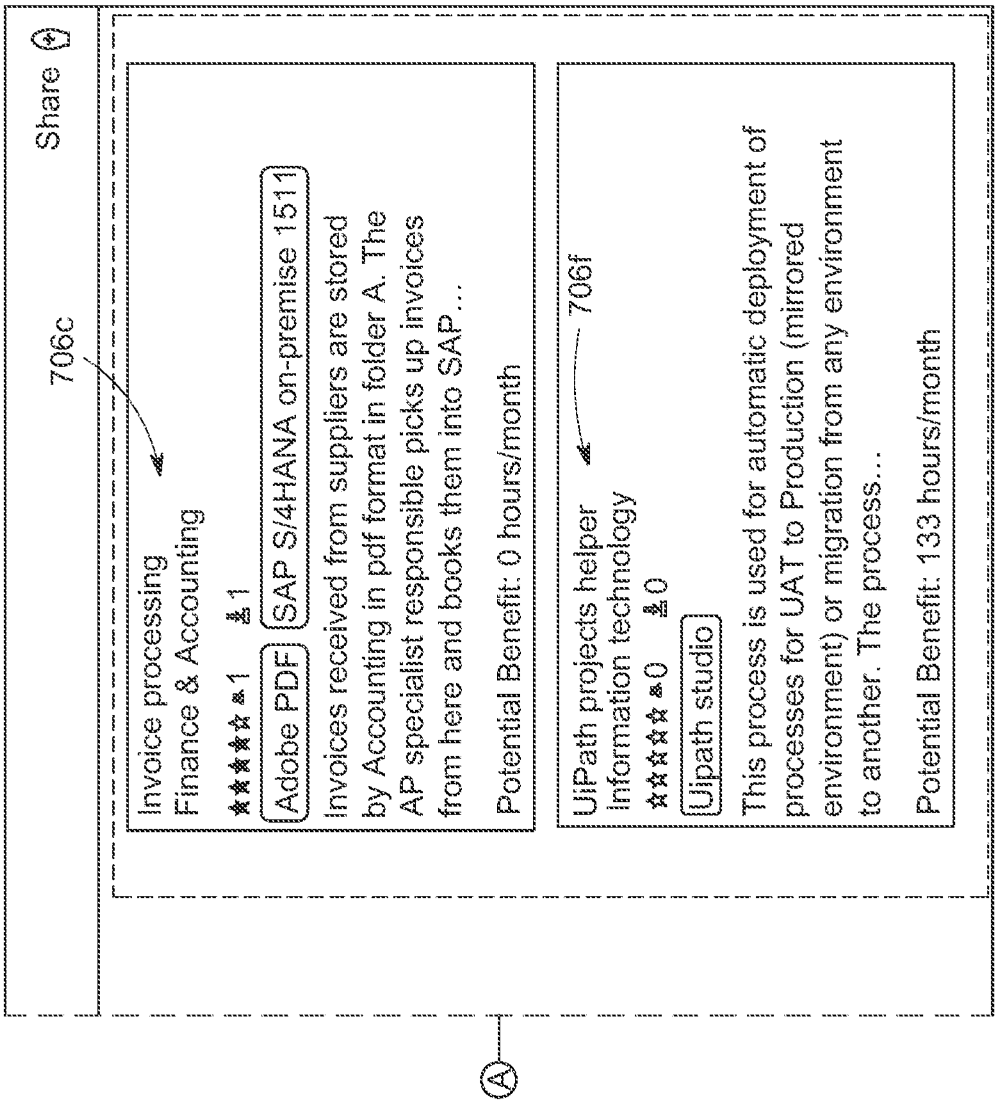

FIG. 3 is an architectural diagram illustrating a relationship 300 between a user interface 310, user-defined activities 320, User Interface (UI) automation activities 330, and drivers 340, according to an embodiment of the present invention. Per the above, user interface 310 comprises an interface between an end user and an RPA application. When the end user is developer, trying to generate or create RPA applications or workflows for automation, user interface 310 may include an application design module or environment, such as UIPath Designer™. The RPA application or workflow may be related to automation of UI access operations, as defined by various types of UI automation activities 330. UI automation activities 330 may be configurable by the user, such as by including an automation store interface or automation store options within user interface 310. Such automation store options may include an automation store tab corresponding to an automation store service of an automation cloud server (or automation cloud). In some example embodiments, the automation store service may be configured via tenant settings provided in the automation cloud. When the automation store service is enabled, the user may view or browse an automation store profile corresponding to the automation in the automation store. For instance, the user may view the automation store profile via an application interface of the automation store. A user interface embodied in this manner is illustrated in FIG. 7A and will be described in detail with description of FIG. 7A. The automation store options may also include a feature corresponding to an instant consumption of automation from the automation store. The instant consumption of automation allows the user to consume a desired automation from the automation store by pressing on a button displayed upon selection of the desired automation. Such user interface embodied in this manner is illustrated in FIGS. 7B, 7C, 7D and 7E and will be described in detail with description of FIGS. 7B, 7C, 7D and 7E.

In some embodiments, the workflows include user-defined activities 320 and UI automation activities 330. Some embodiments identify non-textual visual components in an image associated with the workflows, such as the label data, which is an image of the artwork label, using computer vision (CV) activities. Some CV activities pertaining to such components may include, but are not limited to, extracting of text from segmented label data using optical character recognition (OCR), fuzzy text matching, cropping of segmented label data using ML, comparison of extracted text in label data with ground truth data and the like. In some embodiments, there may be hundreds or even thousands of activities that may be implemented in user defined activities 320 component. However, any number and/or type of activities may be available without deviating from the scope of the invention.

UI automation activities 330 are a subset of special, lower-level activities that are written in lower-level code (e.g., CV activities) and facilitate interactions with the screen. In some embodiments, UI automation activities 330 include the type activity, the click activity, or the hover activity as discussed above. UI automation activities 330 facilitate these activities via drivers 340 that allow the robot to interact with the desired software. For instance, drivers 340 include Operating System (OS) drivers 342, browser drivers 344, VM drivers 346, enterprise application drivers 348, etc.

Drivers 340 are configured to interact with OS drivers 342 at a low level looking for hooks, monitoring for keys, etc. They may facilitate integration with Chrome®, IE®, Citrix®, SAP®, etc. For instance, the "click" activity performs the same role in these different applications via drivers 340. Drivers 340 may enable execution of an RPA application in an RPA system. Browser drivers 344 include a web-based user interface for a user or developer to interact.

Figure 4:
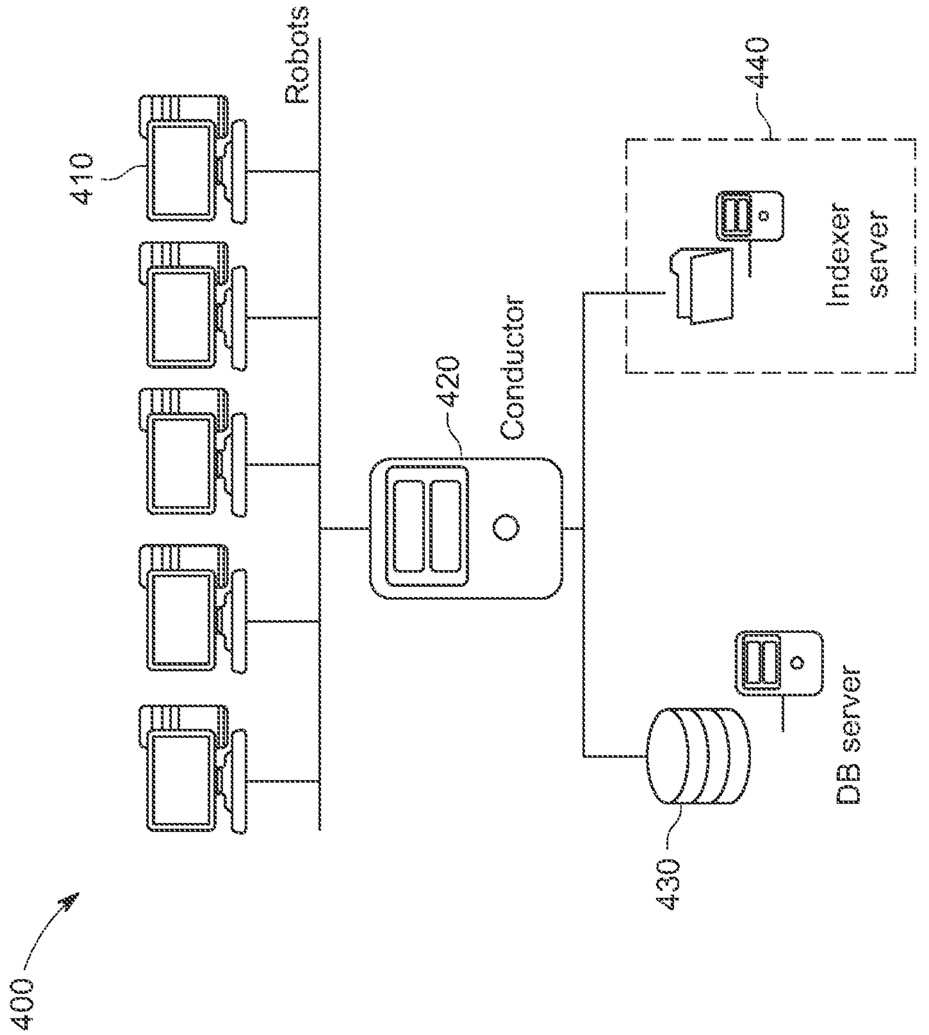
FIG. 4 is an architectural diagram illustrating another RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 (for instance, running robots). In some embodiments, multiple client computing systems 410 are configured to compare the multiple RPA packages and RPA workflows. Multiple client computing systems 410 are further configured to communicate with a conductor computing system 420 via a web application running thereon. Conductor computing system 420, in turn, is configured to communicate with a database server 430 (for instance, the database server 240) and an optional indexer server 440 (for instance, the optional indexer server 250).

With respect to the FIGS. 1 and 3, it should be noted that while the web application is used in these embodiments, any suitable client/server software may be used without deviating from the scope of the invention. For instance, the conductor may run a server-side application that communicates with non-web-based client software applications on the client computing systems. The server may be implemented in localized and distributed forms consistent with computing technology, including cloud computing systems.

Figure 5:
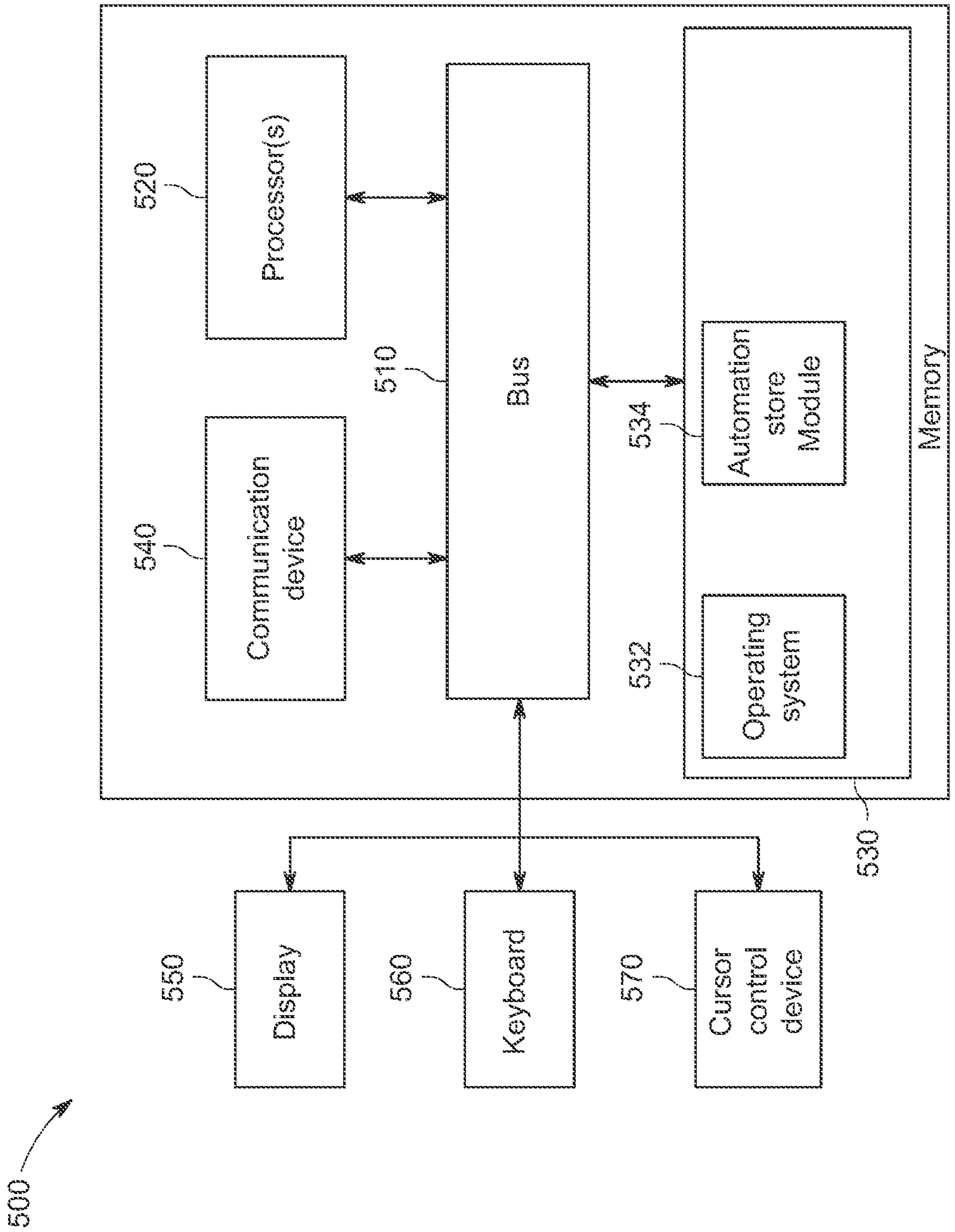
FIG. 5 is an architectural diagram illustrating a computing system configured for consuming automation from an automation store, according to an embodiment of the present invention.

FIG. 5 is an architectural diagram illustrating a computing system 500 configured for seamless consumption of automation from an automation store, according to an embodiment of the present invention. In some embodiments, computing system 500 may be one or more of the computing systems depicted and/or described herein. Computing system 500 includes a bus 510 or other communication mechanism for communicating information, and processor(s) 520 coupled to bus 510 for processing information. Processor(s) 520 could be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 520 may also have multiple processing cores, and at least some of the cores may be configured to perform specific functions. Multi-parallel processing is used in some embodiments. In certain embodiments, at least one of the processor(s) 520 can be a neuromorphic circuit that includes processing elements that mimic biological neurons. In some embodiments, neuromorphic circuits do not require the typical components of a Von Neumann computing architecture.

Computing system 500 further includes a memory 530 for storing information and instructions to be executed by the processor(s) 520. Memory 530 may be comprised of any combination of Random-Access Memory (RAM), Read Only Memory (ROM), flash memory, cache, static storage such as a magnetic or optical disk, or any other types of non-transitory computer-readable media or combinations thereof. The non-transitory computer-readable media may be any available media that may be accessed by processor(s) 520 and may include volatile media, non-volatile media, or both. The media may also be removable, non-removable, or both.

Additionally, computing system 500 includes a communication device 540, such as a transceiver, to provide access to a communications network via a wireless and/or wired connection. In some embodiments, communication device 540 is configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, the communication device 540 includes one or more antennas that are singular, arrayed, phased, switched, beamforming, beam steering, a combination thereof, and or any other antenna configuration without deviating from the scope of the invention.

Processor(s) 520 are further coupled via bus 510 to a display 550, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. The display 550 is configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 560 and a cursor control device 570, such as a computer mouse, a touchpad, etc., are further coupled to bus 510 to enable a user to interface with computing system. However, in certain embodiments, a physical keyboard and mouse are not present, and the user interacts with the device solely through display 550 and/or a touchpad (not shown). Any type and combination of input devices may be used as a matter of design choice. In certain embodiments, no physical input device and/or display is present. For instance, the user interacts with computing system 500 remotely via another computing system in communication therewith, or computing system 500 may operate autonomously.

Memory 530 stores software modules that provide functionality when executed by processor(s) 520. The modules include an operating system 532 for computing system 500. The modules further include an automation store module configured to perform all, or part of the processes described herein or derivatives thereof for seamless consumption of automation from an automation store.

One skilled in the art will appreciate that a "system", such as the computing system 500, could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to emphasize their implementation independence more particularly. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code, for instance, includes one or more physical or logical blocks of computer instructions that, for instance, are organized as an object, procedure, or function. Nevertheless, the executables of an identified module need not be physically located together but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. A flowchart of steps processed by computing system 500 for consuming automation from the automation store is described next with reference to FIG. 6.

Figure 6:
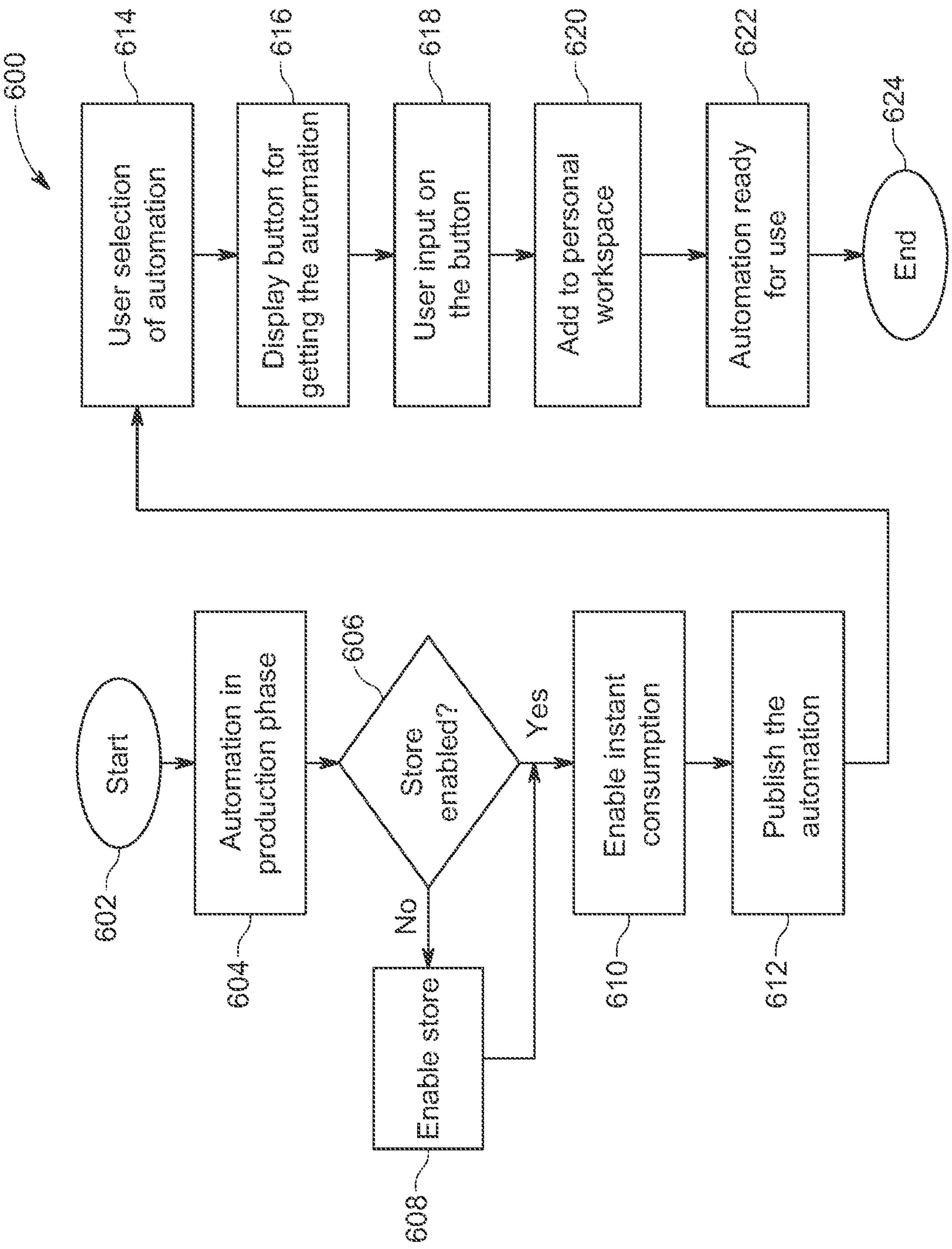
FIG. 6 is a flowchart illustrating a method for consuming automation from an automation store, according to an embodiment of the present invention.

FIG. 6 illustrates a flowchart of a method 600 for consuming at least one automation from an automation store, according to an embodiment of the present invention. In some embodiments, method 600 is performed by computing system 500. For example, method 600 begins at step 602. For example, method 600 is initiated when ideas corresponding to a plurality of automations shared by users are built, tested, and moved into a production environment for deployment of the built and tested plurality of automations. At step 604, status of the plurality of automations, which are moved into the production environment, are updated to a production phase by a reviewer. The reviewer includes a program manager of an enterprise, a technical reviewer, and/or the like. In some cases, the program manager updates an automation idea shared by an employee of the enterprise into the production phase. In some other cases, the technical reviewer updates an automation idea shared by a non-technical user into the production phase.

After the plurality of automations are updated to the production phase, enablement of a service corresponding to the automation store in an automation hub is checked at step 606. If the automation store service is not enabled, method 600 proceeds to step 608. At step 608, the automation store service is enabled by an administrative user of the automation cloud. The administrative user selects a tenant for the automation store service in the automation cloud.

At step 610, a service corresponding to instant consumption of the automation from the automation store is enabled in the automation hub. When the service corresponding to instant consumption of the automation is enabled, a user-interface (UI) element, such as a button, is displayed in the application interface associated with the automation store. In some embodiments, in order to display the button upon the enablement of the service corresponding to instant consumption of automation, one or more conditions are checked. The one or more conditions include, for example, the accessibility of Orchestrator® of the automation hub by a user and the availability of a personal workspace (e.g., an automation folder of the user). When Orchestrator® is not accessible and/or the personal workspace is not available, the user is instructed to request access of Orchestrator® and/or instructed to create the personal workspace.

At step 612, the plurality of automations are published in the automation hub by the reviewer with publishing permission. The plurality of automations are also visible and available for the consumption to the users based on governance and permissions set by the administrative user.

At step 614, a user input for selecting a desired automation from the plurality of automations is received. For example, the user browses the plurality of automations and clicks on the desired automation. At step 616, the UI element, i.e., the button for getting the automation, is displayed to the user. At step 618, a user input for clicking on the button is received. When the user input is received, the API call for accessing the automation is directed to the automation cloud server. As a result, Orchestrator® starts communicating with the automation cloud and the automation store, via the API call. Once the API call direction is successful, the selected automation is uploaded to the Orchestrator®. The uploaded automation is marked as consumed in the automation hub.

At step 620, the selected automation is added to the personal workspace of the user via the automation cloud. In an embodiment, the automation hub communicates with the automation store via API calls. The personal workspace is a folder created in Orchestrator®. Orchestrator® is used as a cloud service by the user on same automation cloud tenant as the automation hub. Orchestrator® communicates with the automation store via API calls. Such communication via the API calls with Orchestrator® may be provisioned via settings provided in the automation hub.

At step 622, the automation is ready for use by the user. In an embodiment, a notification is generated by computing system 500 to indicate to the user that the automation added in the personal workspace is available for accessing the selected automation by the user. The notification along with the automation added in the personal workspace is displayed in the application interface provided by the software robot assistant of the user. At step 624, method 600 ends.

The user may browse the automation from an application interface of the automation store, which is shown and described next with reference to FIGS. 7A-7E.

FIGS. 7A-7E show GUIs 700*a*-700*e* for consuming automation from an automation store, according to an embodiment of the present invention.

FIG. 7A is a GUI 700*a* of an application interface corresponding to an automation store depicting an automation store tab 702, according to an embodiment of the present invention. In this embodiment, automation store tab 702 corresponds to the automation store service that is enabled via a tenant setting in the automation cloud. For instance, when automation store service is enabled in the automation cloud, processor 520 displays automation store tab 702 in GUI 700*a*. Further, GUI 700*a* illustrates an automation store profile 704 that corresponds to automation, such as "Onboarding of new employee". The automation is visible to the user after publication in the automation store from the automation hub.

Further, the automation store also displays a plurality of automations visible to the user, which is shown with reference to FIG. 7B.

FIG. 7B shows a GUI 700*b* including a plurality of automations 706, according to an embodiment of the present invention. In an embodiment, plurality of automations 706 may include automation 706*a*, automation 706*b*, automation 706*c*, automation 706*d*, automation 706*e* and automation 706*f*, as shown in FIG. 7B. Automation 706*a* corresponds to "Onboarding a new employee", automation 706*b* corresponds to "Import ideas to Automation Hub", automation 706*c* corresponds to "Invoice Processing", automation 706*d* corresponds to "UiPath Package Deployment Assistant", automation 706*e* corresponds to "UiPath Process Rollback Assistant" and automation 706*f* corresponds to "UiPath Projects Helper". The user browses plurality of automations 706 and selects at least one automation, such as automation 706*d* from plurality of automations 706. In response to the selection of automation 706*d*, processor 520 displays at least one UI element, such as a button, as illustrated in FIG. 7C.

FIG. 7C shows a GUI 700*c* including a button 708, according to an embodiment of the present invention. In an embodiment, button 708 includes a text "GET", as shown in FIG. 7C. For instance, button 708 is displayed based on enablement of the service corresponding to the instant consumption of an automation, such as automation 706*d* (shown in FIG. 7B) in the automation store. When the user clicks on button 708, automation 706*d* is automatically uploaded to a personal workspace of the user from the automation store via one or more API class directed to the automation cloud. A notification is generated in the automation store to indicate the upload of automation 706*d* to the user, which is shown in FIG. 7D.

Figure 7D:
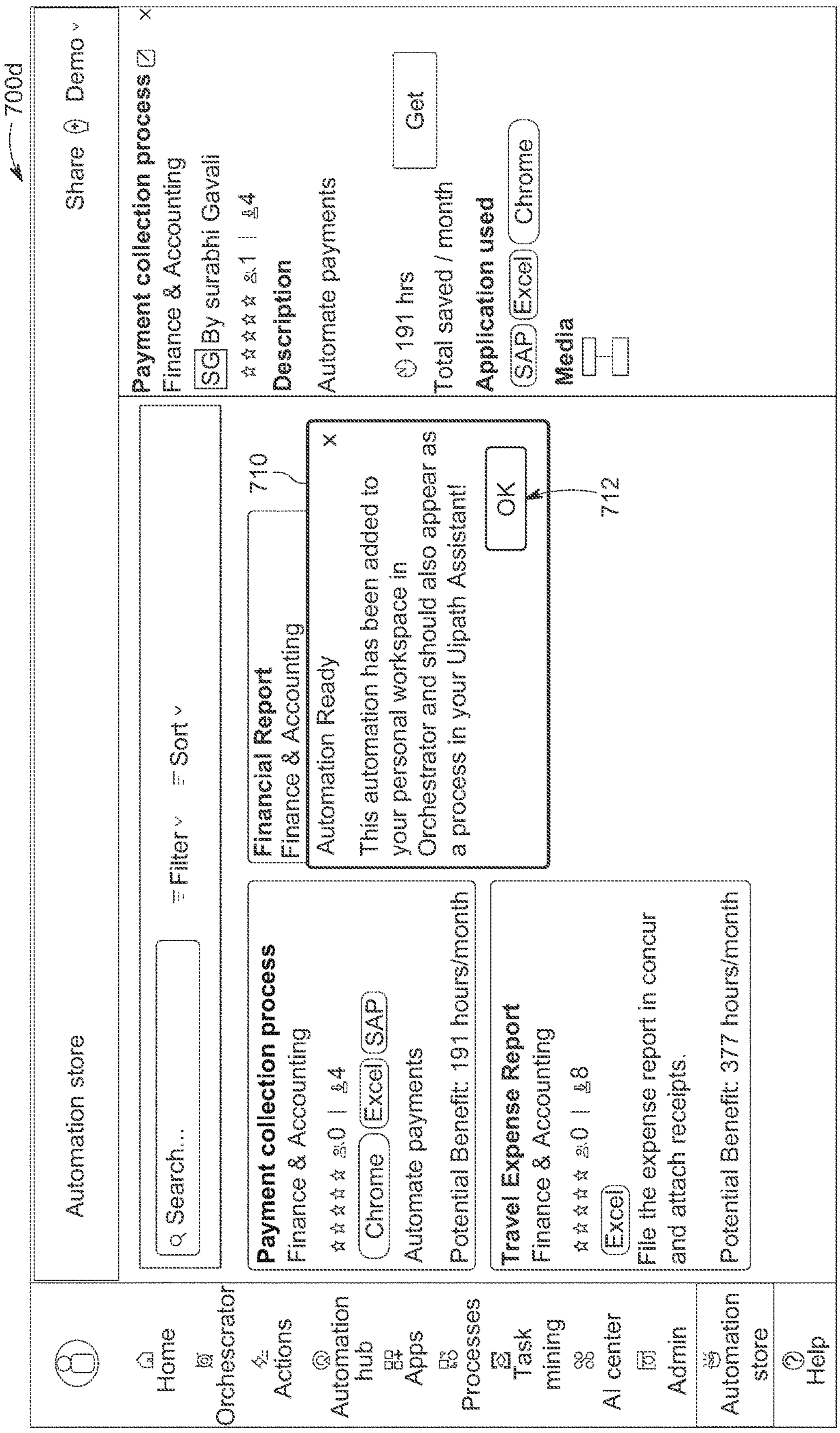

FIG. 7D shows a GUI 700*d* displaying a notification 710 indicating upload of a selected automation, such as automation 706*d* (shown in FIG. 7B) from the automation store, according to an embodiment of the present invention. Notification 710 notifies the user that automation 706*d* is added to the personal workspace and automation 706*d* is available for the user. Notification 710 may mention—"This automation has been added to your personal workspace in Orchestrator® and should also appear as a process in your UIPath Assistant." The user may click on button 712, such as OK button on Notification 710 to accept and access the automation, i.e., automation 706*d* that appears as the process in the software robot assistant of the user. In some example embodiments, processor 520 generates a computer-implemented process for the corresponding automation 706*d*, which is shown in FIG. 7E.

Figure 7E:
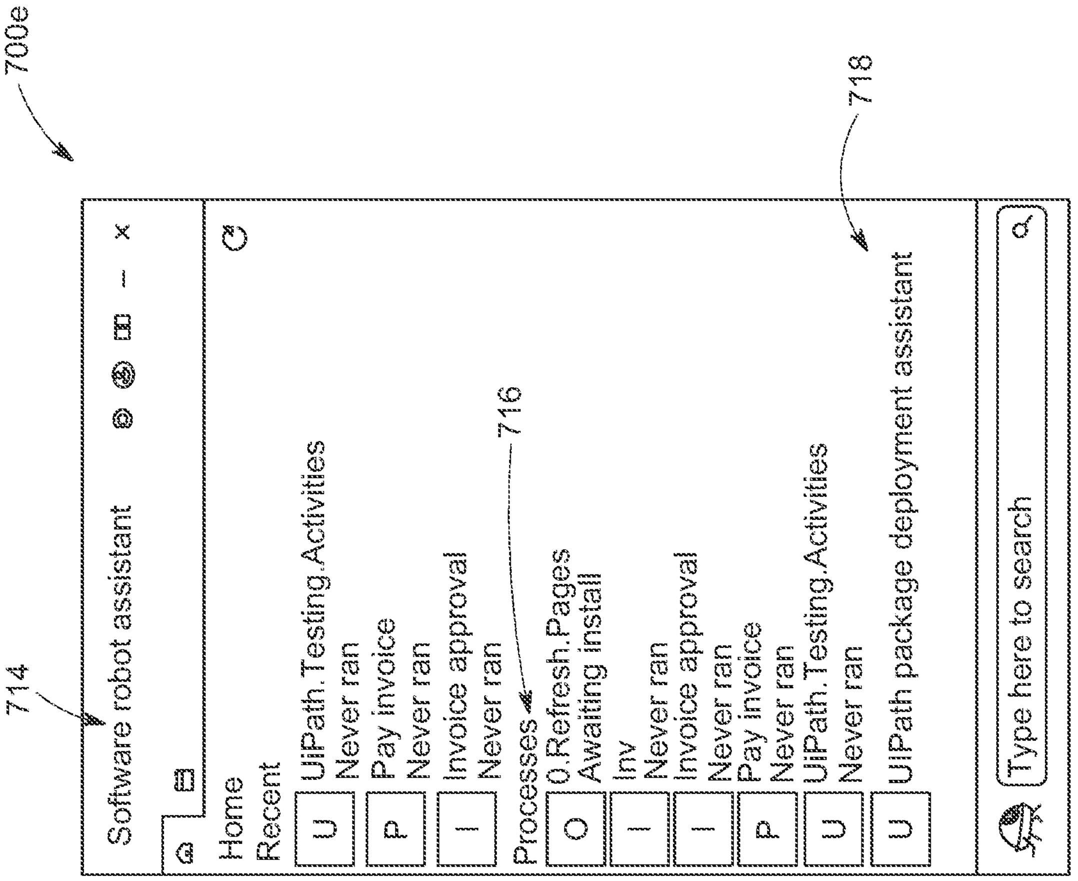

FIG. 7E shows a GUI 700*e* displaying a software robot assistant 714 with a process list 716, according to an embodiment of the present invention. The automation added in the personal workspace, i.e., automation 706*d* appears as process 718 in process list 716 of software robot assistant 714.

Figure 8:
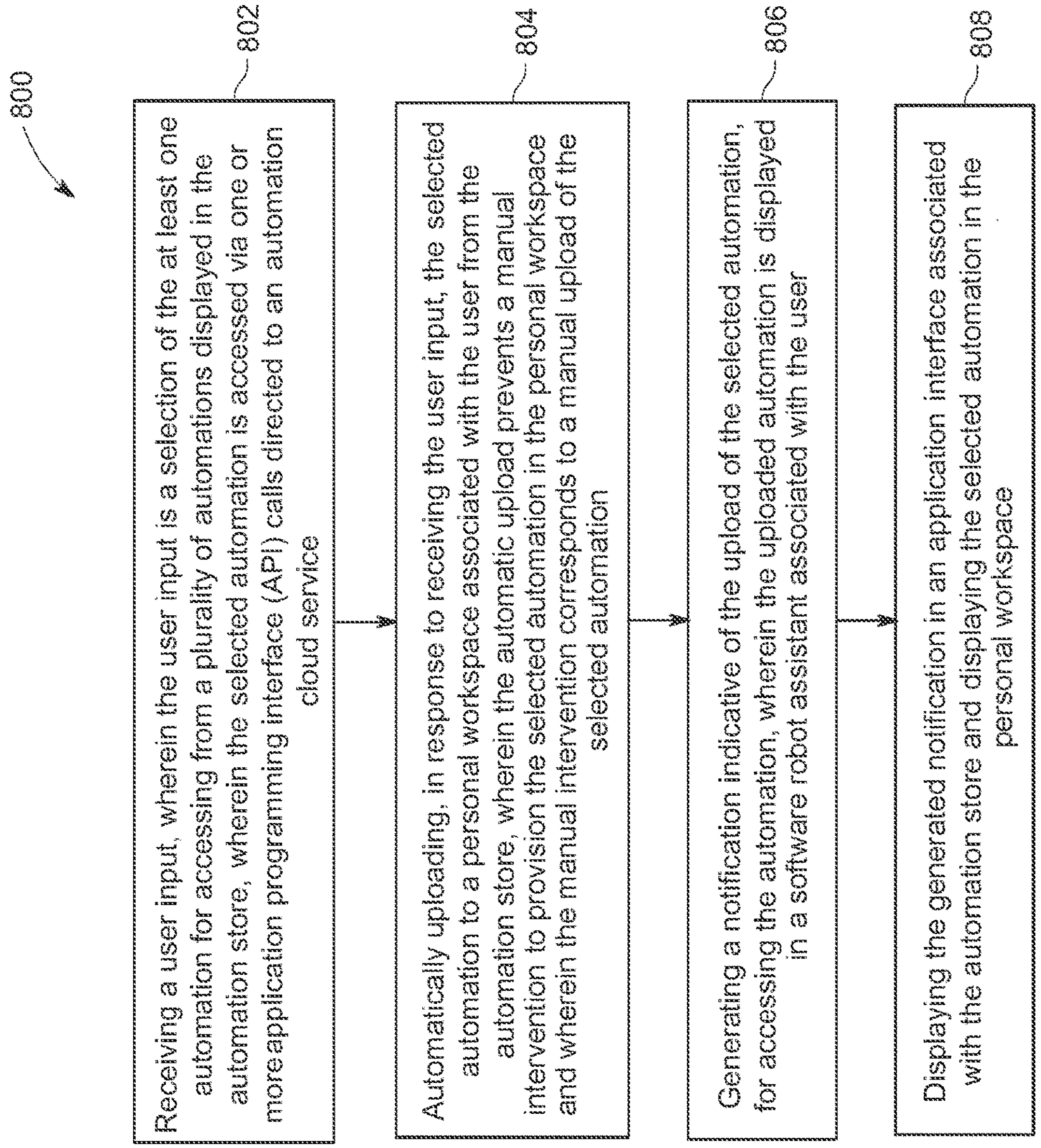
FIG. 8 is a flowchart illustrating a method for consuming automation from an automation store, according to an embodiment of the present invention.

FIG. 8 is a flowchart illustrating a method 800 for accessing at least one automation from an automation store, according to an embodiment of the present invention. At step 802, method 800 includes receiving a user input, which is a selection of at least one automation for accessing from a plurality of automations (e.g., plurality of automations 706 of FIG. 7B) displayed in the automation store. To access the selected automation, one or more API calls are directed from Orchestrator® to the automation cloud server, which comprises the automation store service. At step 804, method 800 includes automatically uploading, in response to receiving the user input, the selected automation (e.g., automation 706*d*) to a personal workspace of the user from the automation store. The automatic upload prevents a manual intervention to provision the selected automation in the personal workspace. The manual intervention corresponds to a manual upload of the selected automation. At step 806, method 800 includes generating a notification (e.g., notification 710 of FIG. 7D) indicative of upload of the selected automation for accessing the automation, i.e., automation 706*d*. This addition of the automation to the personal workspace from the automation store is controlled by processor 520 via the API calls to enable automatic and seamless consumption of the automation from the automation store. The uploaded automation is displayed in a software robot assistant associated with the user (as shown in FIG. 7E). At step 808, method 800 includes displaying, in an application interface associated with the automation store, the generated notification (such as referred to in FIG. 7D) and displaying the selected automation in the personal workspace in the application interface.

In an embodiment, method 800 of FIG. 8 includes configuring a computer program associated with a hardware processor configured to execute a series of operations, wherein the series of operations are used to perform all or some of the steps described in conjunction with the method 800. The hardware processor may, for example, be configured to execute the series of operations associated with method 800 by performing hardware implemented logical functions, executing stored instructions, or executing algorithms for performing each of the operations. Alternatively, the apparatus includes a means for performing each of the operations described above. In this regard, according to an embodiment, examples means for executing the series of operations associated with method 800 include processor 520, which is implemented in system 500 and/or a device or circuit for executing instructions or executing an algorithm for processing information as described above.

The enablement of services, such as the automation store service and the instant consumption service, improves visibility and discoverability of the automation and, in turn, influences the user to consume the automation from the automation store in a seamless manner. The enablement of the automation store service and the instant consumption service is described at step 608 and step 610, respectively. The visibility and discoverability of the automation are shown in FIGS. 7B and 7C. Further, the user selection of the user-interface element, such as the GET button triggering the automatic upload of the automation in the personal workspace, prevents the user to manually provision the automation in the personal workspace and thereby improving time-efficiency and feasibility for the user. Furthermore, the automatic upload of the automation also enables to automatically create a corresponding process of the automation in a software robot assistant of the user, which eases usage of the automation. The software robot assistant is connected to an Orchestrator®, which is integrated with the personal workspace of the user. The connection of the software robot assistant and the personal workspace with the same Orchestrator® prevents performing different types of Orchestrator® configurations. Thus, the automatic upload of the automation in the personal workspace and the software robot assistant improve overall processing time of a computing system (e.g., computing system 500).

The computer program may be implemented in hardware, software, or a hybrid implementation. The computer program may be composed of modules that are in operative communication with one another, and which are designed to pass information or instructions to display. The computer program may be configured to operate on a general-purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system for accessing at least one automation from an automation store, comprising:

a memory configured to store one or more computer-executable instructions; and at least one processor configured to execute the one or more computer-executable instructions to:

receive a user input, wherein the user input is a selection of the at least one automation for accessing from a plurality of automations displayed in the automation store, wherein the selected automation is accessed via one or more application programming interface (API) calls directed to an automation cloud server;

automatically upload, in response to receiving the user input, the selected automation to a personal workspace associated with the user from the automation store, wherein the automatic upload prevents a manual intervention to provision the selected automation in the personal workspace and wherein the manual intervention corresponds to a manual upload of the selected automation;

generate a notification indicative of the upload of the selected automation for accessing the automation, wherein the uploaded automation is displayed in a software robot assistant associated with the user; and display the generated notification in an application interface associated with the automation store, and display the selected automation in the personal workspace in the application interface.

2. The system of claim 1, wherein, for the uploaded automation that is displayed in the software robot assistant, the at least one processor is further configured to execute the one or more instructions to:

generate a computer-implemented process for the uploaded automation;

associate the generated computer-implemented process with a process list of the software robot assistant corresponding to the user; and display the uploaded automation as the generated process of the process list in the software robot assistant.

3. The system of claim 1, wherein the at least one processor is further configured to execute the one or more instructions to enable a service corresponding to the automation store within a tenant of the automation cloud server, wherein the tenant is an instance for the service corresponding to the automation store.

4. The system of claim 3, wherein the at least one processor is further configured to execute the one or more instructions to enable the service corresponding to an instant consumption of the automation from the automation cloud server.

5. The system of claim 2, wherein the at least one processor is further configured to execute the one or more instructions to integrate Orchestrator® with the software robot assistant.

6. The system of claim 1, wherein the at least one processor is further configured to execute the one or more instructions to display the plurality of automations to the user based on a set of criteria and a set of permissions set by an administrative user of the automation store, and wherein the set of criteria corresponds to and one or more rules for accessing the at least one automation.

7. The system of claim 6, wherein the set of permissions comprises one or more of a view permission, an edit permission, a create permission and a delete permission.

8. The system of claim 1, wherein the one or more processors is further configured to:

display the plurality of automations in the application interface of the automation store;

receive the user input indicative of selection of the at least one automation from the plurality of automations;

display at least one UI element in the application interface of the automation store, wherein the UI element comprises a button; and receive the user input corresponding to clicking of the button to indicate accessing of the at least one automation after selection.

9. A method for accessing at least one automation from an automation store, the method comprising:

receiving a user input, wherein the user input is a selection of the at least one automation for accessing from a plurality of automations displayed in the automation store, wherein the selected automation is accessed via one or more Application Programming Interface (API) calls directed to an automation cloud server;

automatically uploading, in response to receiving the user input, the selected automation to a personal workspace associated with the user from the automation store, wherein the automatic upload prevents a manual intervention to provision the selected automation in the personal workspace and wherein the manual intervention corresponds to a manual upload of the selected automation;

generating a notification indicative of the upload of the selected automation for accessing the automation, wherein the uploaded automation is displayed in a software robot assistant associated with the user; and displaying the generated notification in an application interface associated with the automation store and displaying the selected automation in the personal workspace in the application interface.

10. The method of claim 9, wherein for the uploaded automation displayed in the software robot assistant, the method comprises:

generating a computer-implemented process for the uploaded automation;

associating the generated computer-implemented process with a process list of the software robot assistant corresponding to the user; and displaying the uploaded automation as the generated process of the process list in the software robot assistant.

11. The method of claim 9, wherein the method further comprises enabling a service corresponding to the automation store within a tenant of the automation cloud server, wherein the tenant is an instance for the service corresponding to the automation store.

12. The method of claim 11, wherein the method further comprises enabling the service corresponding to an instant consumption of the automation from the automation cloud server.

13. The method of claim 10, wherein the method further comprises integrating Orchestrator® with the software robot assistant.

14. The method of claim 9, wherein the method further comprises displaying the plurality of automations to the user based on a set of criteria and a set of permissions set by an administrative user of the automation store, wherein the set of criteria corresponds to policies and rules for accessing the at least one automation.

15. The method of claim 10, wherein the method further comprises:
- displaying the plurality of automations in the application interface of the automation store;
- receiving the user input indicative of selection of the at least one automation from the plurality of automations;
- displaying at least one UI element in the application interface of the automation store, wherein the UI element comprises a button; and
- receiving the user input corresponding to clicking of the button to indicate accessing of the at least one automation after selection.

16. A computer program stored on a non-transitory computer readable medium, the computer program, when executed by one or more processors, are configured to cause the one or more processors to perform operations for, the operations comprising:
- receiving a user input, the user input is a selection of at least one automation for accessing from a plurality of automations displayed in the automation store, wherein the selected automation is accessed via one or more Application Programming Interface (API) calls directed to an automation cloud server;
- automatically uploading, in response to receiving the user input, the selected automation to a personal workspace associated with the user from the automation store, wherein the automatic upload prevents a manual intervention to provision the selected automation in the personal workspace and wherein the manual intervention corresponds to a manual upload of the selected automation;
- generating a notification indicative of the upload of the selected automation for accessing the automation, wherein the uploaded automation is displayed in a software robot assistant associated with the user; and
- displaying the generated notification in an application interface associated with the automation store and displaying the selected automation in the personal workspace in the application interface.

17. The computer program of claim 16, wherein for the uploaded automation that is displayed in the software robot assistant, the operations comprise:
- generating a computer-implemented process for the uploaded automation;
- associating the generated computer-implemented process with a process list of the software robot assistant corresponding to the user; and
- displaying the uploaded automation as the generated process of the process list in the software robot assistant.

18. The computer program of claim 17, wherein the operations further comprise:
- enabling a service corresponding to the automation store within a tenant of the automation cloud server, wherein the tenant is an instance for the service corresponding to the automation store; and
- enabling the service corresponding to an instant consumption of the automation from the automation cloud server.

19. The computer program of claim 16, wherein the operations further comprise displaying the plurality of automations to the user based on a set of criteria and a set of permissions set by an administrative user of the automation store, wherein the set of criteria corresponds to policies and rules to be adhered by users for accessing the at least one automation.

20. The computer program of claim 16, wherein the operations further comprises:
- displaying the plurality of automations in an application interface of the automation store;
- receiving the user input indicative of selection of the at least one automation from the plurality of automations;
- displaying at least one UI element in the application interface of the automation store, wherein the UI element comprises a button; and
- receiving the user input corresponding to clicking of the button to indicate accessing of the at least one automation after selection.

* * * * *